SIGNALLING RECEIVER

Filed June 17, 1960

INVENTOR
Hendrikus C. van Rossum
Jan K. A. Poppe
BY
Frank R. Trifari
AGENT

United States Patent Office 3,112,430
Patented Nov. 26, 1963

3,112,430
SIGNALLING RECEIVER

Hendrikus Cornelis van Rossum and Jan Karel August Poppe, Hilversum, Netherlands, assignors to North American Philips Company, Inc., New York, N.Y., a corporation of Delaware Filed June 17, 1960, Ser. No. 36,819
Claims priority, application Netherlands July 8, 1959
5 Claims. (Cl. 317—148.5)

The invention relates to a signalling receiver comprising a signalling relay and a transistor control stage controlling the signalling relay. The transistor control stage comprises a transistor in common emitter arrangement which is sequentially released and cut off each time a signalling pulse is supplied to the base electrode. This signalling receiver is of particular advantage when used in carrier wave telephony systems.

The object of the invention is to provide a signalling receiver of the above type, in which the reliability is considerably improved without influencing the reproduction quality of the pulses.

The device according to the invention is characterized in that, in order to protect the said transistor against the high induction voltage when interrupting the energizing current of the relay, a second transistor is connected in the transistor control stage in series with said former transistor. The collector electrode of said second transistor is connected to a terminal of the supply voltage source via the energizing winding of the signalling relay. The terminal is connected to the base electrode via a resistor, and the emitter electrode is coupled to the collector electrode of the former transistor controlled by the incoming signalling pulses.

In order that the invention may be readily carried into effect, it will now be described in greater detail, by way of example, with reference to the accompanying drawing.

Figures 1, 2:
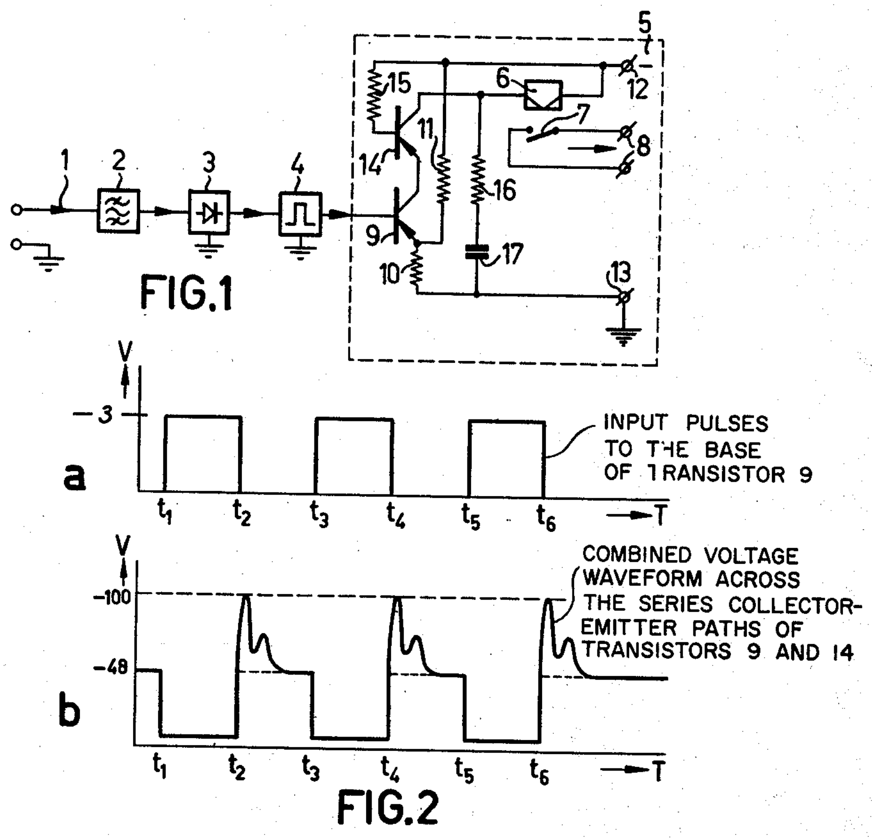
FIG. 1 shows a signalling receiver according to the invention.
FIG. 2 shows some voltage-time diagrams to illustrate the operation of the signalling receiver shown in FIG. 1.

The signalling receiver shown in FIG. 1 forms part of a carrier wave telephony system and is constructed for receiving signalling pulses modulated on a carrier wave of 3825 c./s., which pulses are supplied to the input of the signalling receiver via a lead 1.

In the embodiment shown, the signalling receiver comprises successively a signalling filter 2 having a passband of 3765–3885 c./s., a detector stage 3 and a regenerative pulse repeater 4 in the form of a relaxation generator which is made operative by the demodulated pulses, thereby supplying regenerated pulses of rectangular shape. Via a transistorized control stage 5, to be described below, the output voltage of the pulse regenerator 4 controls a signalling relay 6 with work contact 7 which may be connected, via leads 8, for example to a selector of an automatic telephone system.

In the embodiment shown, the transistor control stage 5 comprises a transistor 9 connected in common emitter arrangement. The transistor 9 is normally blocked (i.e. cut off) by including a resistor 10 of low value in the emitter circuit of the transistor 9 and connecting a resistor 11 between the emitter and the negative voltage terminal 12 of a supply voltage source. The emitter resistor 10 together with the resistor 11 form a potentiometer connected between the voltage source terminals 12, 13 which provides a cut-off voltage of, for example, —1 v. at the emitter electrode of the transistor. The supply voltage amounts to, for example, —48 v.

The transistor 9 is controlled by negative output pulses of the pulse regenerator 4 supplied to the base electrode.

That is to say, the transistor 9 is released by these pulses thereby causing an energization of the relay 6. When these pulses disappear, the transistor 9 is cut off again and the energizing current of the relay 6 is interrupted. It has been found that the reliability of the circuit is detrimentally affected by the occurrence of very high induction voltages across the energizing winding of the relay 6 caused by the sudden interruption of the energizing current of the relay 6 each time that a pulse disappears. These induction voltages amount, for example, to a few times the supply voltage.

The reliability of the transistor control stage 5 is considerably improved, without influencing the reproduction quality, by connecting a second transistor in series with the first transistor 9. The collector electrode of said second transistor 14 is connected, via the energizing winding of the signalling relay 6, to the terminal 12 of the supply voltage source. The terminal 12 of the supply voltage source is connected to the base electrode of the second transistor via a resistor 15, and the emitter electrode of the second transistor is coupled to the collector electrode of the first transistor controlled by incoming signalling pulses. When the transistor 9 is cut off, it forms a very high emitter resistance for transistor 14, thereby causing a blocking of the transistor 14.

If in this device a pulse of negative polarity is supplied to the base electrode of the transistor 9, said transistor 9 suddenly becomes conductive as a result of which the emitter resistance of the transistor 14 suddenly decreases to a very small value. This results in the immediate conduction of transistor 14, and the signalling relay 6 connected in the collector circuit is energized. The base resistor 15 connected to the supply voltage terminal 12 has a sufficiently small value to drive the transistor 14 when a pulse appears.

When this pulse disappears, the emitter circuit resistance of the transistor 14 is suddenly raised to very high value owing to the blocking of the transistor 9. This results in the blocking of transistor 14 and consequently the energizing current of the relay 6 is interrupted. The base electrode of the transistor 14, and as a result also the emitter electrode of the second transistor immediately assume the supply voltage of —48 v., via the resistor 15. That is to say, when the pulse disappears, the collector electrode of the transistor 9, which is connected directly to the emitter of the transistor 14, immediately assumes the supply voltage of —48 v., so that the remainder of the induction voltage is set up at the collector of the transistor 14. The voltage distribution described is to a high extent independent of the transistor characteristics. The high emitter circuit resistance for the transistor 14 formed by the transistor 9 acts as a very high negative feedback resistance.

It is thus achieved in this device, that the two transistors 9, 14 are controlled entirely simultaneously by the pulses supplied to the base electrode of transistor 9. After the disappearance of a pulse the voltage then occurring across the series-combination of the transistors 9 and 14 is distributed between the two transistors 9 and 14 in a manner such that the transistor 9 assumes a voltage which is substantially equal to the supply voltage of —48 v. The transistor 14 considerably increases the reliability of this device without affecting the transmission quality of the pulses to be reproduced. From endurance tests it has appeared, for example, that after more than $10^7$ change-over operations no influencing whatever of the reliability is to be noted, while in addition in this device the considerable independence of the transistor characteristics is very attractive.

As explained above, the transistor 9 invariably assumes the supply voltage of —48 v. independently of the value of the induction surge across the energizing winding of the relay 6 when a pulse disappears. In other words, a maximal protection of the transistor 9 is achieved. Should, in the case of very high induction surges, it likewise be desirable to protect transistor 14, this can be achieved in a simple manner by connecting the series-combination of a resistor 16 and a capacitor 17 parallel to the emitter-collector paths of transistors 9, and 14. If, for example, by suitable proportioning of this series-combination 16, 17 together with the employed signalling relay 6, care has been taken that when a pulse disappears, a voltage occurs across the series-connected transistors 9, 14 equalling approximately twice the supply voltage of —48 v., a voltage of —48 v. will likewise occur across the transistor 14 when a pulse disappears. In this manner an optimum reliability will be realized for the transistor 14.

The following data are given for a circuit of the above type which was extensively tested in practice:

| | |
|---|---|
| Transistors 9, 14 | Philips OC77. |
| Relay 6 | Philips S2B 1400/001/MMM/b. |
| Resistor 10 | 82Ω. |
| Resistor 11 | 3600Ω. |
| Resistor 15 | 8200Ω. |
| Resistor 16 | 1200Ω. |
| Capacitor 17 | 0.5 μf. |

FIG. 2 shows some time diagrams of the device shown in FIG. 1, FIG. 2(*a*) representing three negative pulses which are supplied to the base electrode of the transistor 9, FIG. 2(*b*) representing the associated voltage distributions between the transistors 9 and 14.

If a negative voltage pulse of sufficient amplitude (e.g. —3 v.) is supplied to the base electrode of the transistor 9 at the instant $t_1$, the two transistors 9, 14 become conductive and these transistors 9, 14 assume a minimum collector-emitter voltage drop of a few volts, as shown in FIG. 2, by overdriving. Substantially the whole supply voltage is developed at the signalling relay 6 which is thereby rapidly made to respond.

At the instant $t_2$ the pulse disappears, as a result of which the energizing current of the signalling relay 6 is interrupted and the signalling relay becomes de-energized. At the series-combination of these two transistors suddenly a high voltage of the form shown in FIG. 2(*b*) is set up by the induction surge across the energizing winding of the relay 6 which, in the embodiment shown, reaches a voltage of approximately —100 v. This voltage of —100 v. is distributed between the two transistors 9, 14 in a manner such that across the transistor 9 a voltage of —48 v. is set up, as shown in dotted lines in FIG. 2(*b*), while the remainder of this voltage, approximately —50 v., is set up across the other transistor 14.

As is shown in FIG. 2, the described cycle is repeated when the following signalling pulses, lying between the instants $t_3$–$t_4$ and $t_5$–$t_6$, appear.

It is noted here that to protect the transistor 14 against very high induction voltages, it is possible also in the device shown, to connect a third transistor in series between the transistors 9 and 14, the part of the induction voltage exceeding the supply voltage of —48 v. being divided between the third transistor and the transistor 14. If desired, this measure may be taken in combination with the network 16, 17.

What is claimed is:

1. A signal receiver comprising an inductive signal relay, a control stage for energizing said relay, and a source of signals, said control stage comprising first and second transistors, a source of operating voltage having first and second terminals, means serially connecting the emitter-collector paths of said first and second transistor and said relay, in that order, between said first and second terminals, means applying said signals to the base electrode of said first transistor, means applying a bias to said first transistor for keeping said first transistor cut off in the absence of signals from said source, and resistance means connected between the base of said second transistor and said second terminal, whereby the maximum collector-emitter voltage of said first transistor is substantially equal to said operating voltage.

2. A signal receiver comprising an inductive signal relay, a source of signals, a source of an operating voltage, a first transistor, means serially connecting said relay and the collector-emitter path of said first transistor to said source of operating voltage, means applying said signals to the base of said first transistor, means biasing said first transistor to a non-conductive state in the absence of signals from said source of signals, and means preventing the rise of the emitter-collector voltage of said first transistor from rising above the voltage of said operating voltage due to inductive voltages developed in said relay, said preventing means comprising a second transistor, means serially connecting the emitter-collector path of said second transistor between said relay and the collector-emitter path of said first transistor, and bias resistor means connected between the base of said second transistor and said source of operating voltage, whereby the maximum emitter-collector voltage of said first transistor is substantially equal to said operating voltage.

3. A signal receiver comprising a source of pulsatory signals, an inductive relay, and means for energizing said relay in response to said signals comprising a first transistor having first base, emitter, and collector electrodes, a second transistor having second base, emitter and collector electrodes, a source of operating potential having first and second terminals, means applying said signals to said first base, first and second resistor means connected between said first emitter and said first and second terminals respectively to bias said first transistor to a cut-off condition in the absence of signals, means connecting said first collector to said second emitter, means connecting said relay between said second collector and second terminal, and third resistor means connected between said second base and second terminal, whereby inductive voltages greater than said operating voltage due to stopping of current flow in said relay do not appear between said first emitter and first collector and the maximum voltage between said first emitter and first collector is substantially equal to said operating voltage.

4. The receiver of claim 3, comprising a serially connected capacitor and fourth resistor connected between said first terminal and second collector.

5. The receiver of claim 4, in which said capacitor and fourth resistor are proportioned so that the instantaneous voltages appearing between said first emitter and first collector is substantially equal to the instantaneous voltage appearing between said second emitter and second collector when the current in said relay is cut off.

References Cited in the file of this patent

UNITED STATES PATENTS

| | | |
|---|---|---|
| 2,835,829 | Sourgens et al. | May 20, 1958 |
| 2,994,784 | White et al. | Aug. 1, 1961 |